United States Patent [19]

Bennett et al.

[11] 4,148,267

[45] Apr. 10, 1979

[54] PACKER WHEEL ASSEMBLY FOR TILLAGE APPARATUS

[75] Inventors: Michael V. Bennett, Boone; Donald T. Sorlie, Ankeny, both of Iowa

[73] Assignee: Deere & Company, Moline, Ill.

[21] Appl. No.: 807,710

[22] Filed: Jun. 17, 1977

Related U.S. Application Data

[63] Continuation of Ser. No. 649,507, Jan. 15, 1976, abandoned.

[51] Int. Cl.$^2$ ............................................. A01C 5/06
[52] U.S. Cl. ....................................... 111/85; 111/62; 111/80; 111/84
[58] Field of Search .................. 111/6, 62, 84, 63, 85, 111/87, 80, 73; 239/150, 103; 47/1.7; 239/590.5

[56] References Cited

U.S. PATENT DOCUMENTS

| Re. 24,008 | 5/1955 | Mosher | 239/150 |
|---|---|---|---|
| 591,354 | 10/1897 | Jones | 111/84 |
| 808,000 | 12/1905 | Brennan, Jr. | 111/85 |
| 1,072,632 | 9/1913 | Milburn | 111/86 X |
| 2,990,186 | 6/1961 | Gandrud | 111/10 X |
| 3,074,727 | 1/1963 | Sosalla et al. | 239/689 X |
| 3,369,506 | 2/1968 | Stralow et al. | 111/6 |
| 3,373,705 | 3/1968 | Hansen et al. | 111/73 |
| 3,543,704 | 8/1968 | Hasen et al. | 111/63 X |
| 3,568,936 | 3/1971 | Honnold | 239/590.5 |
| 3,749,035 | 7/1973 | Cayton et al. | 111/62 X |
| 4,051,792 | 10/1977 | Brandt, Jr. et al. | 111/85 |

FOREIGN PATENT DOCUMENTS

| 109659 | 5/1968 | Denmark | 111/85 |
|---|---|---|---|
| 242825 | 11/1909 | Fed. Rep. of Germany | 111/85 |
| 463815 | 7/1925 | Fed. Rep. of Germany | 111/85 |
| 821861 | 10/1951 | Fed. Rep. of Germany | 111/85 |
| 875468 | 9/1942 | France | 111/85 |
| 79329 | 10/1962 | France | 111/85 |
| 88964 | 4/1967 | France | 111/85 |
| 1098018 | 1/1968 | United Kingdom | 111/87 |

*Primary Examiner*—Edgar S. Burr
*Assistant Examiner*—Steven A. Bratlie

[57] ABSTRACT

A packer wheel assembly is disclosed that is particularly useful for sod seeding purposes. The apparatus includes a mounting bracket having a pair of spaced arms with a packer wheel being rotatably mounted between the center portion of each of the arms. A packer pivot rod is connected between the arms at the front portion of each so that the arms pivot about a horizontal axis. A packer stop is also provided at the front of the arms rearwardly of the pivot, and an adjustable spray shield is attached to the rear of the bracket. This assembly provides the needed flexibility to follow the contour of the ground and allow the assembly to be adjusted to various cutter wheel depths with the packer wheel having a capability to follow the furrow for all selected cutter wheel depths.

1 Claim, 2 Drawing Figures

PACKER WHEEL ASSEMBLY FOR TILLAGE APPARATUS

This is a continuation, of application Ser. No. 649,507, filed Jan. 15, 1976 now abandoned.

FIELD OF THE INVENTION

This invention relates to a packer wheel assembly and, more particularly, relates to a packer wheel assembly for a tillage apparatus.

BACKGROUND OF THE INVENTION

The use of tillage apparatus is well known, and various types of apparatus have been developed that are useful for one or more tasks.

As such apparatus has been developed and utilized, it has become evident that such apparatus could be improved, particularly for the many different tasks to be accomplished. It has been discovered, for example, that conventional tillage apparatus, such as disc harrows, disc cultivators and rotary hoes, have not proved to be entirely suitable for preparing ground for seeding where legumes are to be grown in established grass sod.

For growing legumes in an established grass sod, the ground surface is often uneven or rocky and may have grass swards of different thicknesses thereon. To prepare such ground for seeding or grassland renovation, it is desirable that the number of trips that an implement must make over such ground be held to a minimum in order to accomplish such tasks as tilling, seeding, cultipacking and spraying of herbicides. Hence, an implement capable of performing all of the various tasks in succession during a single pass over the ground was needed.

Such an implement would preferably be towed, since this allows the tillage apparatus to be disconnected from the tractor in order to release the tractor for other uses, and, when towed, the engine of the towing tractor is commonly utilized for power, as shown, for example, by the patent to Kaller, U.S. Pat. No. 2,957,529.

Responding to the need for improved tillage apparatus, units have heretofore been developed having a capability for opening a furrow, depositing seed in the furrow, packing the seed and spraying chemicals on the planted area. Examples of such apparatus for carrying out some or all of the various tasks can be found, for example, in U.S. Pat. Nos. 2,685,243; 2,734,439; 3,491,709; 3,566,813; 3,568,613; 3,604,515; 3,611,956; 3,673,970; 3,701,327; 3,749,035 and 3,866,552.

Cutting of the sward and sod mat and provision of a furrow therein has however proved to be a continuing problem, at least in some instances, as well as the problem of packing the seed.

While packer wheel assemblies have heretofore been known and suggested, such assemblies have not been completely suitable for all applications, including providing satisfactory flexibility over the contour of the ground and/or adjustability to different heights of a cut furrow.

SUMMARY OF THE INVENTION

This invention provides an improved packer wheel assembly for a tillage apparatus that is well suited to provide the needed flexibility over the contour of the ground and, in addition, provides for adjustability of the packer wheel to accommodate different depths of furrows cut by a cutter wheel preceding the packer wheel. A packer wheel stop is provided, as is an adjustable spray shield on the packer wheel assembly.

It is therefore an object of this invention to provide an improved packer wheel assembly.

It is still another object of this invention to provide an improved packer wheel assembly for a tillage apparatus.

It is yet another object of this invention to provide an improved packer wheel assembly providing for pivoting of the packer wheel.

It is yet another object of this invention to provide an improved packer wheel assembly providing for flexibility of the packer wheel over the contour of the ground and providing for adjustment variations of the packer wheel assembly.

It is still another object of this invention to provide an improved packer wheel assembly having a pivot stop.

It is yet another object of this invention to provide an improved packer wheel assembly having an adjustable spray shield.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein-disclosed invention are meant to be included as coming within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
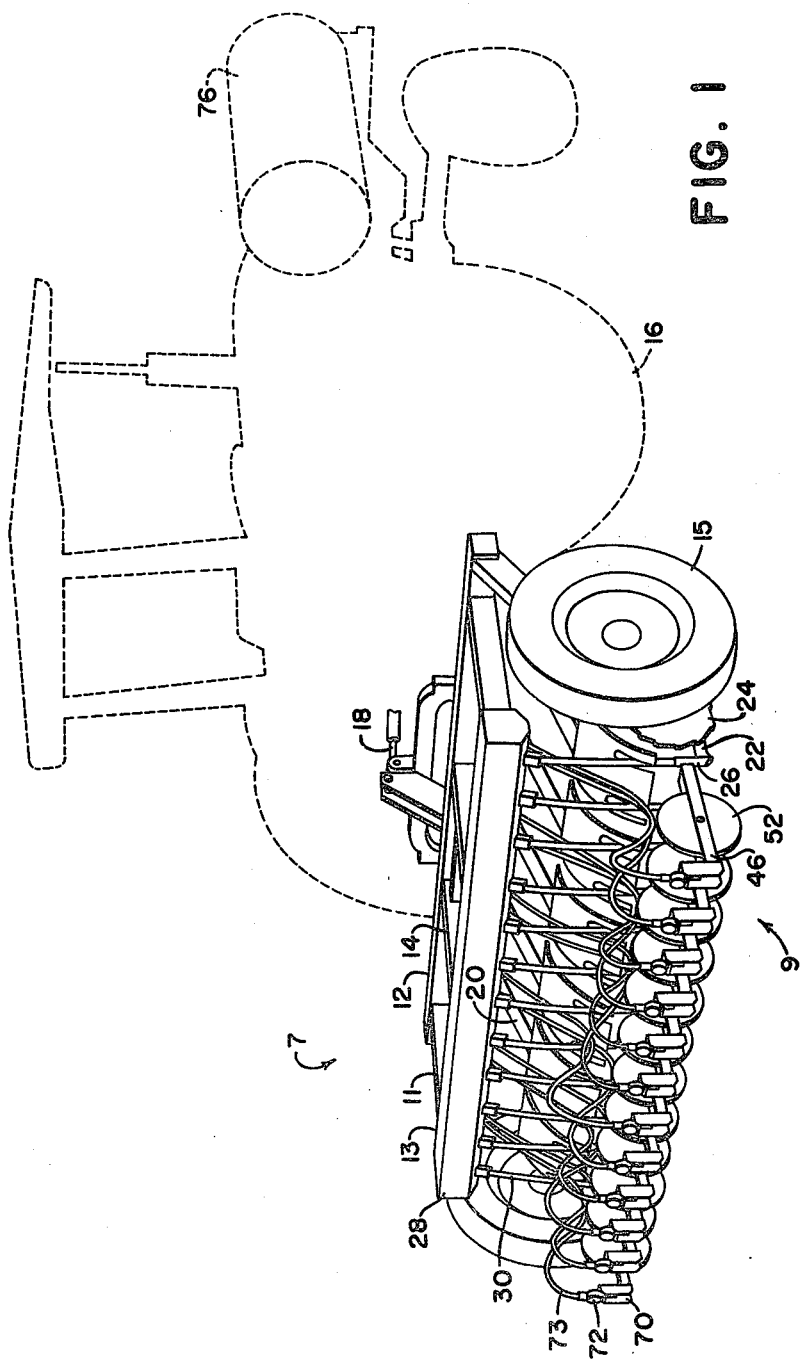
FIG. 1 is a perspective view of the tillage apparatus having the improved packer wheel assembly of this invention mounted thereon.

Referring now to the drawings, FIG. 1 shows a tillage apparatus 7 that includes the improved packer wheel assembly 9 of this invention mounted thereon. As shown, apparatus 7 conventionally includes a tool bar or frame means 11 with elongated members 12 and 13 having cross braces 14 at suitable locations. Gauge wheels 15 mounted on the frame means may also be provided. A tractor 16 is provided to tow the apparatus (or, alternatively, it could be self-propelled, if desired) and power from the tractor is conventionally coupled to the apparatus, as, for example, through shafts connected through universal joints between the power take-off of the tractor and a gear box mounted on the apparatus. When towed, the apparatus is conventionally attached to a tractor as by the conventional three-point hitch 18 as indicated in FIG. 1.

As is shown in FIG. 1, the frame means supports a plurality of pivoted arms 20, each of which is connected to one or more skids 22. One or more cutter wheels 24 are mounted on each arm 20 so as to be associated with a skid 22, and a seed boot 26 is mounted on each skid adjacent to and rearwardly of each cutter wheel 24. Seed boots 26 are connected to a seed hopper 28 through tubing 30. Each cutter wheel arm is preferably biased downwardly to urge the skid into ground contact during movement of the apparatus by the tractor (when towed). As shown, the packer wheel assembly 9 of this invention is mounted rearwardly of skid 22, so that the packer wheel assembly follows the furrow cut by the cutter wheel and packs seed therein.

The foregoing structure has been only briefly discussed herein to the extent deemed necessary to provide a structural setting to better explain the improvements of this invention. The overall combination of a cutter, seeding tube and packer is shown, for example, in U.S. Pat. Nos. 3,611,956; 3,749,035 and 3,866,552 and may be referred to for a more complete general description.

Figure 2:
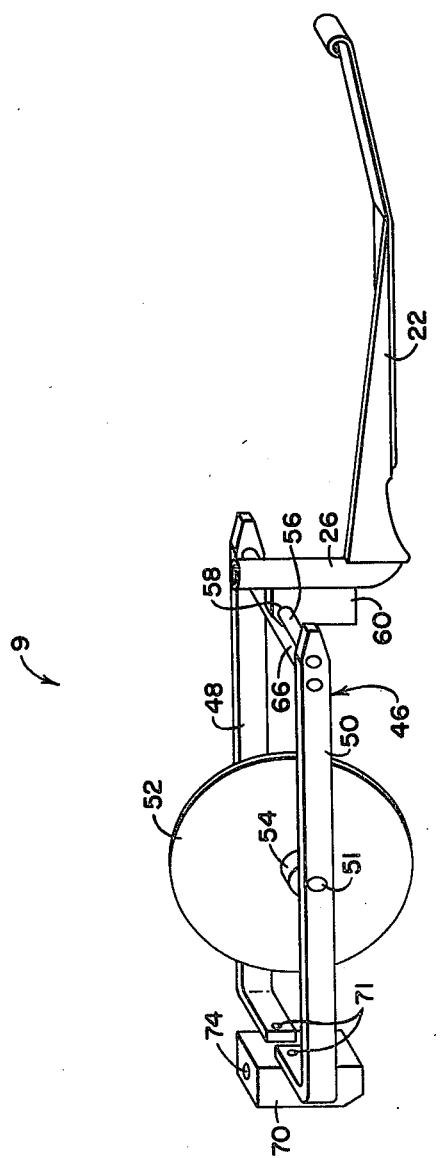
FIG. 2 is a perspective view of the packer wheel assembly shown in FIG. 1.

As can be seen in FIG. 2, packer wheel assembly 9 includes a packer wheel bracket 46 which includes a pair of spaced arms 48 and 50. A shaft 51 is centrally mounted between the arms 48 and 50 and a packer wheel 52 is rotatably mounted therein for free rotation as by means of hub 54. A pivot rod 56 is fastened between the front portion of each of arms 48 and 50, with the rod being receivable in an aperture 58 of associated bracket 60 attached to the rear of seed boot 26 so that the packer wheel assembly can be pivoted about a horizontal axis. As can be seen from FIG. 1, the packer wheel assembly 9 follows skid 22 having thereon seed tube boot 26 and cutter wheel 24 so that a furrow cut by the cutter wheel can have seed deposited in the cut furrow, after which the packer wheel follows and is received in said furrow to pack seed in the furrow.

A pivot stop 66 is also provided just rearwardly of the pivot rod, constituting a stop for the packer wheel assembly for transporting of the same, the stop operating in conjunction with the seed tube boot 26 and bracket 60 to hold the packer wheel assembly for transport.

An adjustable spray shield 70 is provided at the rear of bracket 46, with arms 48 and 50 of the bracket being bent at right angles at the rear ends for mounting of the spray shield thereon. The spray shield is heightwise adjustable and is conventionally fastened to arms 48 and 50 by means of bolts 71. As is conventional, spray shield 70 receives a conventional spray mechanism 72 therein with tubing 73 therefrom being directed through aperture 74 in the spray shield to a chemical reservoir or tank 76, in which a spray material, such as a herbicide, is stored. The stored material is then sprayed on the planted area, with the shield protecting the packer wheel assembly during spraying since the shield at least partially surrounds the spray mechanism.

In operation, the packer wheel assembly pivots as is necessary so that the packer wheel better follows the contour of the ground and is able to engage the bottom of a cut furrow regardless of the depth of the furrow. To assure that the packer wheel is received in the bottom of the furrow, the packer wheel is thin and preferably about one-half the width of the cut furrow.

As can be seen from the foregoing, this invention provides an improved cutter wheel assembly that is particularly useful for tillage apparatus. Hence, the invention is not to be considered as being limited to the particular details given, nor to the specific application to which reference has been made during the description of the apparatus, except insofar as may be required by the scope of the appended claims.

What is claimed is:

1. In a tillage unit having a forwardly positioned cutter wheel for cutting a furrow in the earth surface as the unit advances and a rigid vertically extending seed tube, a packer wheel assembly, comprising:

bracket means including a pair of spaced generally horizontal L-shaped arms equally offset to opposite sides of the furrow, said arms being composed of fore-and-aft extending opposed portions and transversely extending rear end portions extending inwardly from the respective fore-and-aft portions toward one another;

a thin packer wheel mounted on said bracket means between the fore-and-aft extending portions and forward of the rear end portions of said arms and centrally located with respect thereto so as to track said cutter wheel and to ride in the furrow cut thereby;

pivot means connected between the front portion of each of said arms and said tube to provide pivoting of said arms about a transverse horizontal axis;

a brace extending between the arms closely adjacent the aforesaid horizontal axis and engageable with the tube to thereby serve as pivot stop means between said pair of arms and said tube for limiting downward movement of said arms; and a transverse spray shield in fore-and-aft alignment with the tube and wheel extending between and connecting the rear end portions of said arms.

* * * * *